R. J. GATLING.
Seed-Planter.
No. 3,581.
Patented May 10, 1844.
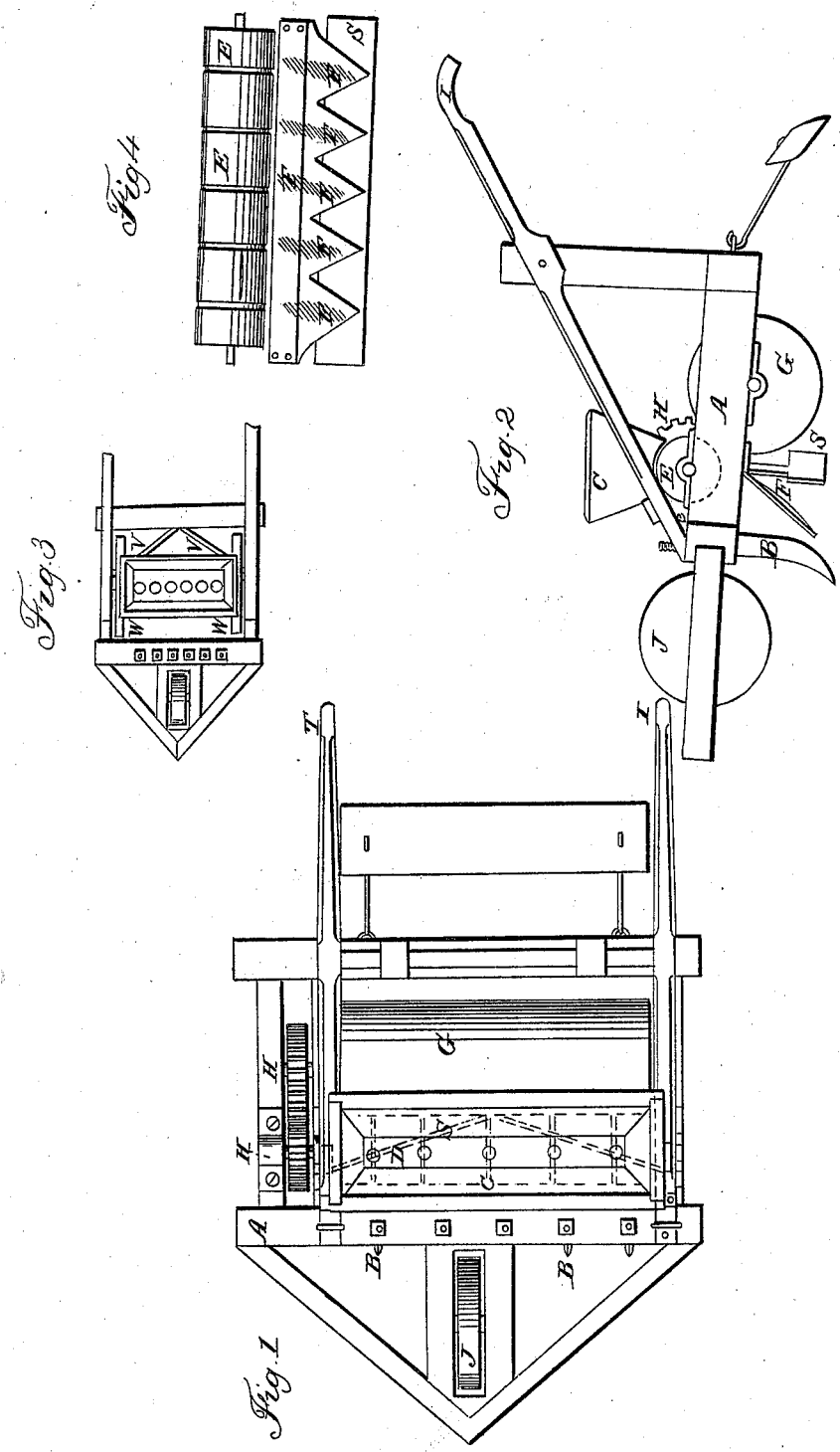

UNITED STATES PATENT OFFICE.

RICHD. J. GATLING, OF MURFREESBOROUGH, NORTH CAROLINA.

IMPROVEMENT IN SEED-PLANTERS.

Specification forming part of Letters Patent No. 3,581, dated May 10, 1844.

*To all whom it may concern:*

Be it known that I, RICHARD J. GATLING, of Murfreesborough, in the county of Hertford and State of North Carolina, have invented a new and useful Improvement in Machines for Planting Rice and other Grain and Seeds, which is described as follows, reference being had to the annexed drawings of the same, making part of this specification.

Figure 1 is a top view. Fig. 2 is a side elevation. Fig. 4 is a front view of the spouts, the coverers, and the grooved roller.

This machine consists of a rectangular horizontal frame, A, in which are placed drills B for opening or making parallel trenches or furrows to receive the rice; a hopper, C, having a perforated leather bottom, D, in which the rice to be planted is put; a revolving channeled or perforated roller, E, for receiving the rice from the hopper C and depositing the same into inclined spouts F, which conduct it to the furrows made by the drills B, and oblique scrapers or coverers S following said spouts for covering the rice; a roller, G, for rolling the earth hard down upon the rice; cog-wheels H, or band-pulleys, on the axles of said rollers, connected together, the power to turn the same being derived from the animal drawing the machine and the friction of the large roller G upon the ground; handles I to guide the machine; a wheel or wheels, J, placed in the forward part of the frame to regulate or determine the depth of entrance of the drills, and consequently the depth of the furrows. These parts are made of any suitable material and of any convenient size or proportion, and the arrangement of the gearing may be varied so as to cause the channeled roller to turn toward or from the hopper, and may be placed inside or outside the frame.

The channeled roller E is placed perpendicularly under the hopper C, and the spouts F are placed under the channeled roller with their points near the heels of the drills B, said spouts being fastened to the frame A. The coverer S is placed behind the spouts F and in front of the roller G, and said coverer is also fastened to the frame A. (Represented by dotted lines at S in Fig. 1.)

The leather or elastic bottom D of the hopper will yield when any grain falls between the edges of the leathern bottom and the outer surface of the grooved cylinder, and thus will the grain be prevented from being broken or injured.

Operation: The rice to be planted is put into the hopper C. The machine is drawn forward by animal or other power. The drills B open the furrows. The friction of roller G upon the ground turns cog-wheel H on its axle. This turns cog-wheel H' on the axle of the channeled roller E, and also roller E. The latter receives the rice in its channels from the apertures in the leather bottom of the hopper and conveys it round to the spouts F, which conduct it to the furrows and deposit it therein. The oblique scrapers S, following after them, cover the earth over the rice. The roller G rolls the earth.

What I claim as my invention, and desire to secure by Letters Patent, is—

The combination and arrangement of the perforated hopper C D, revolving channeled cylinder E, and inclined conducting-spouts F, as above described.

R. J. GATLING.

Witnesses:
WM. P. ELLIOT,
BENJ. ROOP.